United States Patent
Radomyselski et al.

(10) Patent No.: US 9,950,840 B2
(45) Date of Patent: Apr. 24, 2018

(54) RECLOSABLE BATTERY PACKAGE

(71) Applicant: DURACELL U.S. OPERATIONS, INC., Wilmington, DE (US)

(72) Inventors: Arseni Radomyselski, Ridgefield, CT (US); Scott A. Stewart, Cornwall-On-Hudson, NY (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

(21) Appl. No.: 15/214,897

(22) Filed: Jul. 20, 2016

(65) Prior Publication Data
US 2018/0022509 A1    Jan. 25, 2018

(51) Int. Cl.
*B65D 27/12*      (2006.01)

(52) U.S. Cl.
CPC .................. *B65D 27/12* (2013.01)

(58) Field of Classification Search
CPC ........ B65D 27/12; B65D 73/00; B65D 73/02; B65D 75/20; B65D 75/36; B65D 85/08; B65D 85/20
USPC ............. 206/461–471, 484–484.2, 703; 220/495.01–495.05; 383/111
See application file for complete search history.

(56) References Cited

U.S. PATENT DOCUMENTS

| | | |
|---|---|---|
| 3,303,930 A | 2/1967 | Hyland |
| 3,394,801 A | 7/1968 | Hanson |
| 3,635,331 A | 1/1972 | Zucker |
| D302,662 S | 8/1989 | Calcerano et al. |
| 4,958,731 A | 9/1990 | Calcerano |
| 5,184,724 A * | 2/1993 | Mayled ................ B65D 75/38 206/466 |
| 5,297,679 A | 3/1994 | Rondone et al. |
| 5,839,583 A | 11/1998 | Pope et al. |
| D427,523 S | 7/2000 | Calcerano |
| D432,411 S | 10/2000 | Pirro et al. |
| D433,936 S | 11/2000 | Pirro et al. |
| 6,155,414 A | 12/2000 | Vaessen |
| D449,779 S | 10/2001 | Otto |
| D451,015 S | 11/2001 | Otto |
| D456,249 S | 4/2002 | Pearson et al. |

(Continued)

FOREIGN PATENT DOCUMENTS

| | | |
|---|---|---|
| CH | 687196 A5 | 10/1996 |
| EP | 0885151 B1 | 11/1999 |
| WO | WO-97/05038 A1 | 2/1997 |

OTHER PUBLICATIONS

International Application No. PCT/US2017/042971, International Search Report and Written Opinion, dated Oct. 11, 2017.

(Continued)

*Primary Examiner* — Bryon Gehman
(74) *Attorney, Agent, or Firm* — Marshall, Gerstein & Borun LLP

(57) ABSTRACT

A reclosable battery package includes a first panel having a first removable portion and a second panel optionally having a second removable portion. A pouch is disposed between the first panel and the second panel. The first panel and the second panel are joined along perimeter edges and a pouch perimeter flange is disposed between the first panel and the second panel. The pouch is slidably movable between the first panel and the second panel when the first removable portion is removed from the first panel to expose contents stored within the pouch.

19 Claims, 3 Drawing Sheets

(56) References Cited

U.S. PATENT DOCUMENTS

| | | | |
|---|---|---|---|
| D456,252 S | 4/2002 | Weil | |
| 6,439,390 B1 * | 8/2002 | Kumakura | B65D 75/327 206/469 |
| D462,615 S | 9/2002 | Weil | |
| D479,125 S | 9/2003 | Kumakura et al. | |
| D499,962 S | 12/2004 | Lee et al. | |
| D508,398 S | 8/2005 | Lee et al. | |
| D508,844 S | 8/2005 | Calcerano | |
| D510,261 S | 10/2005 | Calcerano | |
| D524,654 S | 7/2006 | Harada et al. | |
| D577,992 S | 10/2008 | Sutker et al. | |
| D581,264 S | 11/2008 | Mapes, Jr. | |
| D584,138 S | 1/2009 | Lafortezza et al. | |
| 7,571,813 B2 | 8/2009 | Weisskopf | |
| D651,509 S | 1/2012 | Methe et al. | |
| D662,815 S | 7/2012 | Methe et al. | |
| 8,430,244 B2 * | 4/2013 | Kennedy | B65D 75/20 206/703 |
| D694,101 S | 11/2013 | Radomyselski et al. | |
| D712,280 S | 9/2014 | Radomyselski et al. | |
| D751,387 S | 3/2016 | Markle et al. | |
| 9,701,449 B2 * | 7/2017 | Jacobus | B65D 75/368 |
| 2001/0052478 A1 | 12/2001 | Casanova et al. | |
| 2003/0217949 A1 | 11/2003 | Schamante | |
| 2006/0065570 A1 | 3/2006 | Martin et al. | |
| 2006/0096887 A1 | 5/2006 | Morrison | |
| 2006/0207909 A1 | 9/2006 | Tada et al. | |
| 2006/0283748 A1 | 12/2006 | Daio et al. | |
| 2007/0170087 A1 | 7/2007 | Narpes et al. | |
| 2007/0273330 A1 | 11/2007 | Beghelli | |
| 2009/0057184 A1 | 3/2009 | Leaman | |
| 2012/0031809 A1 | 2/2012 | Methe et al. | |
| 2012/0037537 A1 | 2/2012 | Schein et al. | |
| 2012/0205276 A1 | 8/2012 | Shackford | |
| 2012/0222990 A1 | 9/2012 | Fujiwara et al. | |
| 2014/0209497 A1 | 7/2014 | Jacobus | |
| 2015/0291331 A1 | 10/2015 | Bradford | |
| 2017/0166379 A1 | 6/2017 | Larsen | |

OTHER PUBLICATIONS

U.S. Appl. No. 15/784,018, Battery Package, filed Oct. 13, 2017.
U.S. Appl. No. 29/582,649, Packaging for Batteries, filed Oct. 28, 2016.
U.S. Appl. No. 29/582,662, Packaging for Batteries, filed Oct. 28, 2016.
U.S. Appl. No. 29/582,673, Packaging for Batteries, filed Oct. 28, 2016.
U.S. Appl. No. 29/582,680, Packaging for Batteries, filed Oct. 28, 2016.
U.S. Appl. No. 29/622,156, Battery Packaging, filed Oct. 13, 2017.
U.S. Appl. No. 29/622,157, Battery Packaging, filed Oct. 13, 2017.
Ecobliss Launches Easy to Open Blister Pack, downloaded from the Internet at: <http://print-packagingblog.com/ecobliss-launches-easy-to-open-blister-pack/> (posted Sep. 9, 2013).

* cited by examiner

RECLOSABLE BATTERY PACKAGE

FIELD OF THE INVENTION

The invention relates generally to packages for consumer products and more specifically, to reclosable packages for batteries.

BACKGROUND OF THE INVENTION

Electrochemical cells, or batteries, are commonly used as electrical energy sources. Small batteries are especially useful in powering consumer products. Small batteries come in a variety of sizes. Common small battery sizes are AAA, AA, C, D, and 9V. However, other types of small batteries are also available for other types of products, such as watches, cameras, etc. Because typical consumer products often require significant amounts of energy to function, multiple batteries are often required to operate a single product. Often consumers will use more than one consumer product, which multiplies the battery requirement. As a result, consumers may purchase packages of batteries (sometimes including as many as 40 or more batteries in a single package) so that they do not have to return to the store often.

Battery packages may include a plastic front portion that is adhered to a paper or cardboard back portion. The plastic front portion is usually clear so that the consumer can see the type of battery in the package, although the plastic front portion does not have to be clear. A utensil, such as scissors or a knife, may be needed to open a battery package. This presents problems to the consumer when such a utensil is not readily available. Additionally, once the package is opened (either by cutting the adhered portion of the plastic front portion, or by punching a hole in the paper or cardboard back portion), the unneeded batteries may fall out of the opening, which often causes consumers to store the unneeded batteries in a bag of some sort until they are needed later. This leads to unnecessary clutter and it also subjects the unneeded batteries to damage as well inadvertent discharge, or shorting, should the battery(ies) come into contact with a substance that completes an electrical circuit.

While some battery packages have been developed that include perforations in the paper or cardboard back portion, to make the package easier to open, such packages may be susceptible to unintentional opening during transportation, particularly if the packages are handled roughly. Moreover, these types of packages also may allow all batteries to come out of the package once the package is opened. So the consumer still needs to store the unneeded batteries as discussed above.

SUMMARY OF THE INVENTION

In one aspect, a reclosable battery package includes a first panel, the first panel including a first body, a first main portion, a first removable portion, and a center open portion. The reclosable battery package also includes a second panel having a second main portion. The reclosable battery package further includes a pouch, the pouch having a perimeter flange and a central receptacle, the central receptacle protruding outward, away from the perimeter flange. The first body and the second body are joined along perimeter edges of the first body and the second body and the pouch perimeter flange is disposed between the first body and the second body, the central receptacle extending through the center open portion of the first body. The pouch is slidably movable between the first main portion and the second main portion when the first removable portion is removed from the first body exposing a first edge of the center open portion, so that an interior portion of the central receptacle is exposed when the pouch is slidably moved relative to the first main portion and to the second main portion.

The reclosable battery package may include one or more of the following preferred forms.

In some forms, the second body includes a second removable portion, the pouch being slidably removable between the first main portion and the second main portion when the second removable portion is removed from the second body.

In some forms, the first removable portion is removably attached to the first body by a first plurality of perforations and the second removable portion is removably attached to the second body by a second plurality of perforations, the first plurality of perforations being non-aligned with the second plurality of perforations.

In other preferred forms, the first plurality of perforations extend from a first corner of the center open portion towards the perimeter edge of the first body and from a second corner of the center open portion towards the perimeter edge of the first body.

In yet other preferred forms, the first plurality of perforations includes a first lateral set of perforations and a second lateral set of perforations, the first lateral set of perforations extending from the first corner of the center open portion towards the perimeter edge of the first body in a first direction, and the second lateral set of perforations extending from the second corner of the center open portion towards the perimeter edge of the first body in a second direction.

In yet other preferred forms, at least one of the first lateral set of perforations and the second lateral set of perforations is non-linear.

In yet other preferred forms, the first lateral set of perforations is separated from the first corner of the center portion, thereby forming a first tie portion, and the second lateral set of perforations is separated from the second corner of the second portion, thereby forming a second tie portion.

In yet other preferred forms, the first tie portion has a tie length between the first corner and closest perforation in the first lateral set of perforations, the tie length being between 0.15 in and 0.4 in.

In yet other preferred forms, the second plurality of perforations extends across the second body and the second plurality of perforations is oriented parallel to the first edge of the center open portion.

In yet other preferred forms, the second plurality of perforations includes an offset tab portion that is parallel to the first edge of the center open portion, while being offset from a remainder of perforations in the second plurality of perforations.

In yet other preferred forms, the tab portion is offset from the remainder of perforations in the second plurality of perforations by a tab distance, the tab distance being approximately 0.5 in.

In yet other preferred forms, the second body includes a crease that is offset from the tab portion, the crease being co-linear with the perforations in the second plurality of perforations that are not part of the tab portion.

In yet other preferred forms, the center open portion includes a bottom edge that is curved.

In yet other preferred forms, the bottom edge is curved in an arc that is approximately 0.25 in deep.

In yet other preferred forms, the first body and the second body are formed from paperboard and the pouch is formed from thermoform plastic.

In yet other preferred forms, the paperboard in the first body includes fibers that are oriented generally perpendicular to at least some of the perforations in the first plurality of perforations and the paperboard in the second body includes fibers that are oriented generally perpendicular to at least some of the perforations in the second plurality of perforations.

In yet other preferred forms, at least one battery is disposed in the central receptacle of the pouch.

In yet other preferred forms, the first body includes a locking channel formed in one side of the central opening and the pouch includes a locking tab formed in the perimeter flange, the locking tab being slidable within the locking channel and the locking channel limiting a slidable distance of the pouch relative to the first body.

In yet other preferred forms, the second body includes a locking cut-out and the pouch includes a locking tab formed in the perimeter flange, the locking tab being slidable within the locking cut-out and the locking cut-out limiting a slidable distance of the pouch relative to the second body.

In another aspect, a method of opening a reclosable battery package includes providing a reclosable battery package having a first panel, the first panel including a first body having two sets of opposed side edges and a center open portion; a second panel, the second panel including a second body having two sets of opposed side edges; and a pouch, the pouch being slidably disposed between the first body and the second body; folding portions of the first body and the second body rearward, towards the second body, approximately 180 degrees relative to an unmanipulated plane of the first body and the second body; tearing the first body and the second body along perforations formed in the first body and the second body; and sliding the pouch in a first direction relative to the first body and the second body to expose products stored in an interior of the pouch.

In yet other preferred forms, the pouch may be slid in a second direction, opposite to the first position, to close the interior of the pouch, thereby preventing any products stored in the interior of the pouch from being accessible.

BRIEF DESCRIPTION OF THE DRAWINGS

While the specification concludes with claims particularly pointing out and distinctly claiming the subject matter, which is regarded as forming the present invention, the invention will be better understood from the following description taken in conjunction with the accompanying drawings.

DETAILED DESCRIPTION OF THE INVENTION

Figure 1:
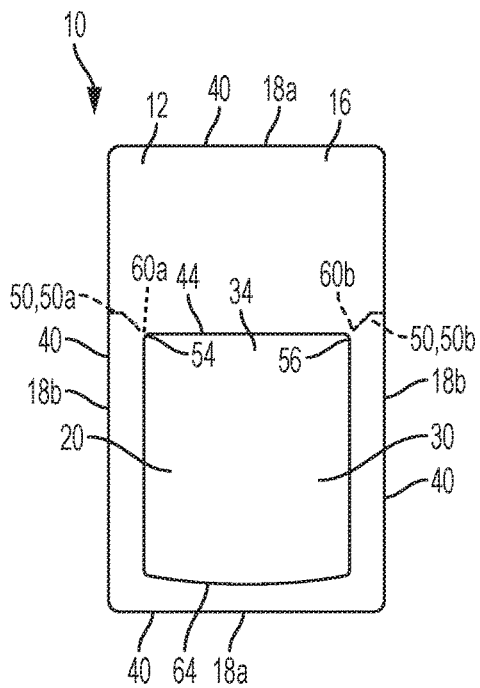
FIG. 1 is a front plan view of a first embodiment of a reclosable battery package.
Figure 2:
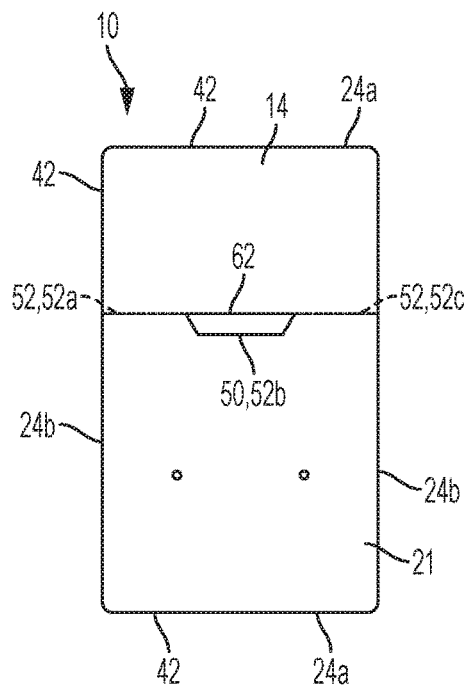
FIG. 2 is a back plan view of the reclosable battery package of FIG. 1.
Figure 3:
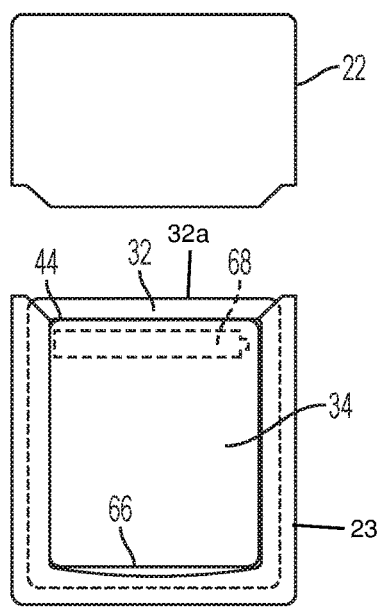
FIG. 3 is a front plan view of the reclosable battery package of FIG. 1 with a top portion removed.
Figure 4:
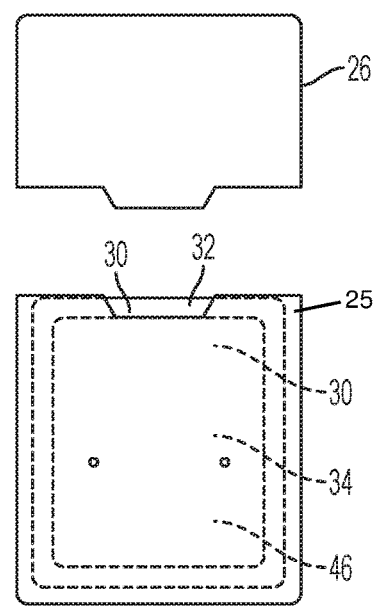
FIG. 4 is a back plan view of the reclosable battery package of FIG. 1 with the top portion removed.
Figure 5:
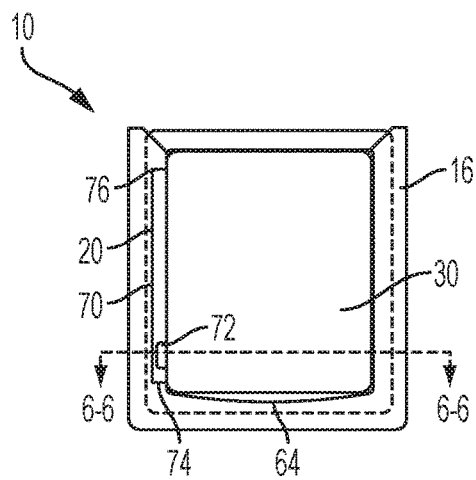
FIG. 5 is a front plan view of a second embodiment of a reclosable battery package having a top portion removed.
Figure 6:
FIG. 6 is a cross-sectional view of the reclosable battery package of FIG. 5, taken along line 6-6 in FIG. 5.
Figure 7:
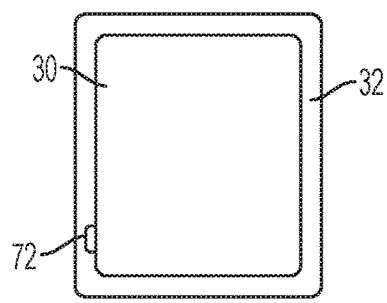
FIG. 7 is a front plan view of a pouch of the reclosable battery package of FIG. 5.
Figure 8:
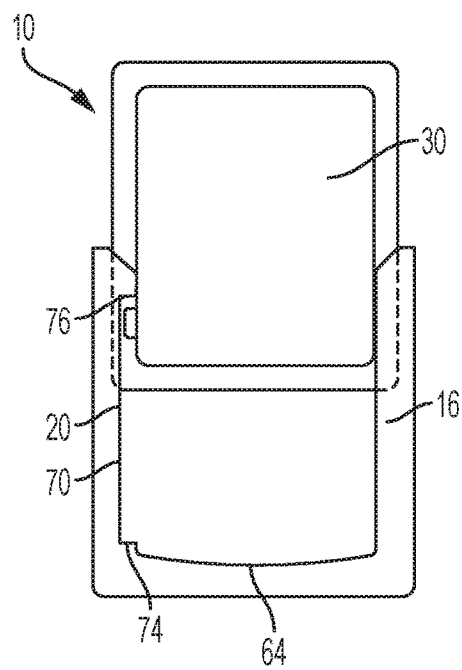
FIG. 8 is a front plan view of the reclosable battery package of FIG. 5, with the pouch slid out relative to a first panel.

Electrochemical cells, or batteries, may be primary or secondary. Primary batteries are meant to be discharged, e.g., to exhaustion, only once and then discarded. Primary batteries are described, for example, in David Linden, Handbook of Batteries (McGraw-Hill, 4$^{th}$ ed. 2011). Secondary batteries are intended to be recharged. Secondary batteries may be discharged and then recharged many times, e.g., more than fifty times, more than a hundred times, or more than a thousand times. Secondary batteries are described, e.g., in David Linden, Handbook of Batteries (McGraw-Hill, 4$^{th}$ ed. 2011). Batteries may contain aqueous or non-aqueous electrolytes. Accordingly, batteries may include various electrochemical couples and electrolyte combinations. Consumer batteries may be either primary or secondary batteries. However, because of the energy stored in the batteries and because of the exposed battery terminals, consumer batteries must be protected during shipping and store display. Furthermore, packaging for consumer batteries must also be relatively easy to open for the consumer after purchase while preventing theft of the batteries within the packaging.

Turning now to FIGS. 1-4, a reclosable battery package 10 includes a first panel 12 and a second panel 14. The first panel 12 includes a first body 16 having two sets of opposed side edges 18a, 18b, and a center open portion 20. The first body 12 also includes a first removable portion 22, which is removable from a first main portion 23. The second panel 14 includes a second body 21 having two sets of opposed side edges 24a, 24b and a second removable portion 26, which is removable from a second main portion 25. A pouch 30 includes a perimeter flange 32 and a central receptacle 34, the central receptacle 34 protruding outward, away from the perimeter flange 32. In some embodiments, the first panel 12 and/or the second panel 14 may include an aperture (not shown) for hanging the reclosable battery package 10, for example, on a hook of a retail display unit.

The first body 16 and the second body 21 are joined to one another along perimeter edges 40 of the first body 16 and perimeter edges 42 of the second body 21, and the pouch perimeter flange 32 is captured between the first body 16 and the second body 21, the central receptacle 34 extending through the center open portion 20 of the first body 16. The pouch 30 is slidably movable along a channel defined between the first body 16 and the second body 21 when the first removable portion 22 is removed from the first body 16 exposing a first edge 44 of the center open portion 20, and when the second removable portion 26 is removed from the second body 21 (FIGS. 3 and 4), thereby completely exposing at least a portion of a top edge of the pouch 30, which makes the pouch 30 easier to grasp for the consumer. When the first removable portion 22 and the second removable portion 26 are removed from the first main portion 23 and the second main portion 25, respectively, an interior portion 46 of the central receptacle 34 is exposed when the pouch 30 is slidably moved relative to the first body 16 and to the second body 21, allowing the consumer to access any batteries (or other contents) retained within/by the battery package pouch 30.

In some embodiments, only one removable portion needs to be provided and removed to allow the pouch 30 to slide relative to the first main portion 23 and the second main portion 25. For example, in some embodiments, only a first removable portion 22 is provided and needs to be removed from the first main portion 23 to allow the pouch 30 to be slidably movable relative to the first main portion 23 and to the second main portion 25. In such embodiments, the height of the first removable portion 22 and the height of the second body 21, specifically the distance between top perimeter edge 42 of the second body 21 and a top 32a of the pouch perimeter flange 32 (when the pouch is in a closed position in which access to the pouch is substantially prevented because a face of the second body 21 is in substantial contact with the perimeter flange) may be reduced so that the pouch 30 needs only to slide a short distance to expose the central receptacle 34 and the contents disposed therein.

As illustrated, the first removable portion 22 is removably attached to the first body 16 by a first plurality of perforations 50 and the second removable portion 26 is removably attached to the second body 21 by a second plurality of perforations 52. In the illustrated embodiment, the first plurality of perforations 50 is not aligned with the second plurality of perforations 52. More specifically, in the illustrated embodiment, the first plurality of perforations 50 extend from a first corner 54 of the center open portion 20 towards the perimeter edge 40 of the first body 16 and from a second corner 56 of the center open portion 20 towards the perimeter edge 40 of the first body 16.

Thus, as shown, the first plurality of perforations 50 includes a first lateral set of perforations 50a and a second lateral set of perforations 50b. Lateral in this instance means being offset to the side of the center open portion 20, and not necessarily horizontal or straight. To the contrary, the lateral sets of perforations 50a, 50b need not be straight, but may be non-linear (e.g., curved or bent). The first lateral set of perforations 50a extends from the first corner 54 of the center open portion 20 towards the perimeter edge 40 of the first body 16 in a first direction, and the second lateral set of perforations 50b extends from the second corner 56 of the center open portion 20 towards the perimeter edge 40 of the first body 16 in a second direction. Although the first and second directions could be co-linear, in the illustrated embodiment, the first and second directions are not co-linear, but are instead disposed at an angle relative to first edge 44 of the center open portion 20. The angled orientations of the perforations 50a, 50b advantageously make the package more robust during shipping and facilitate returning the pouch 30 to the closed position because extended angled upper edges are provided after removal of the removable portion 22 and these serve to guide the pouch 30 upon movement into the center open portion 20 as the pouch 30 slides relative to the first main portion 23 and to the second main portion 25.

In some embodiments, one or both of the first lateral set of perforations 50a and the second lateral set of perforations 50b can be non-linear. More specifically, in some embodiments, one or both of the first lateral set of perforations 50a and the second lateral set of perforations 50b may formed with a turn or curve or bend, as illustrated in FIG. 1, where some of the perforations are generally parallel to the first edge 44 of the center open portion 20 (e.g., the perforations closest to the perimeter edge 40) and other perforations are angled relative to the first edge 44 of the center open portion 20 (e.g., the perforations closest to the first corner 54). In other embodiments, the parallel and angled perforations may be reversed. For example, in other embodiments, the parallel perforations may be located closest to the first corner 54 and the angled perforations may be located near the perimeter edge 40.

A first perforation in the first lateral set of perforations 50a is separated from the first corner 54 of the center portion 20, by a first tie portion 60a, which is the un-perforated portion of the first panel 12 between the first corner 54 and the closest perforation in the first lateral set of perforations 50a to the first corner 54. Similarly, a first perforation in the second lateral set of perforations 50b is separated from the second corner 56 of the center open portion 20, by a second tie portion 60b, which is the un-perforated portion of the first panel 12 between the second corner 56 and the closest perforation in the second lateral set of perforations 50b to the second corner 56. In some embodiments, the first tie portion 60a has a tie length between the first corner 54 and the first perforation in the first lateral set of perforations 50a, the tie length being between 0.15 in and 0.4 in. Similarly, in some embodiments, the second tie portion 60b has a tie length between the second corner 54 and the first perforation in the second lateral set of perforations 50b, the tie length being between 0.15 in and 0.4 in. Tie lengths in this range allow the first and second removable portions 22, 26 to be bent up to about 90 degrees without breaking. This feature prevents the package from unintentionally opening during movement, such as during transport or during stocking at a retail store.

The second plurality of perforations 52 extends substantially entirely across the second body 21 and the second plurality of perforations 52 includes two sets of lateral perforations 52a, 52c that are oriented generally parallel to the first edge 44 of the center open portion 20. The second plurality of perforations 52 also includes an offset set of perforations defining an offset tab portion 52b that is parallel to the first edge 44 of the center open portion 20, while being offset from the lateral perforations 52a, 52c in the second plurality of perforations 52. In some embodiments, the tab portion 52b is offset from the two lateral perforations 52a, 52c by a tab distance. The tab distance may be between 0.25 in and 0.75 in, for example, approximately 0.5 in. Tab distances of between 0.25 in and 0.75 in provide sufficient access to allow a consumer to grasp an exposed portion of the perimeter flange 32 where the tab portion 52b used to be (see e.g., FIG. 4).

The second body 21 also may include a crease 62 that is offset from the tab portion 52b, the crease 62 being co-linear with the lateral perforations 52a, 52c in the second plurality of perforations 52. The crease 62 reduces stress on the perforations when the first and/or second bodies 16, 21 are bent up to about 90 degrees, which advantageously prevents unintentional opening of the reclosable battery package 10 during movement and/or handling.

The center open portion 20 may include a bottom edge 64 that is curved, specifically, to provide clearance at the curved bottom edge 64 such that the pouch 30 is directionally guided upon insertion into the center opening to achieve the closed position. The curved bottom edge 64 of the center open portion 20 thereby advantageously prevents binding of a bottom edge 66 of the central receptacle 34 of the pouch 30 when the pouch 30 is slid into the center open portion 20. In some embodiments, the bottom edge 64 is curved in an arc that has a depth between 0.1 in and 0.5 in, for example, approximately 0.25 in deep. Arcs that have a depth between 0.1 in and 0.5 in produce an adequate reduction in binding while remaining relatively small to reduce packaging size.

In some embodiments, the first body 16 and the second body 21 may be formed from paperboard and the pouch 30 may be formed from thermoform plastic. For example, the reclosable battery package 10 may be formed from Natralock® made by the Meadwestvaco Company. In some embodiments, the paperboard in the first body 16 includes fibers that are oriented generally perpendicular to at least some of the perforations in the first plurality of perforations 50 and the paperboard in the second body 21 includes fibers that are oriented generally perpendicular to at least some of the perforations in the second plurality of perforations 52.

The central receptacle 34 of the pouch 30 may be sized and shaped to receive a plurality of batteries 68 for storage and presentation.

Turning now to FIGS. 5-8, in another embodiment, the second body 21 may include a locking channel 70 located opposite the central opening 20 of the first body 16, and the pouch 30 may include a locking tab 72 formed below the perimeter flange 32. The locking tab 72 is slidable within the locking channel 70 and the locking channel 70 advantageously limits a slidable distance of the pouch 30 relative to the first body 16 by including a lower stop 74 and an upper stop 76 such that the pouch cannot be easily separated from the first main portion 23 and the second main portion 25, thereby reducing the likelihood of misplacing one of the aforementioned components. The upper stop 74 may be formed as a shelf in the locking channel 70 while the lower stop 74 may be formed as a shoulder in the locking channel 70. The locking tab 72 is protrudes outward, away from the perimeter flange 32, in the same direction as the central receptacle 34.

Figure 9:
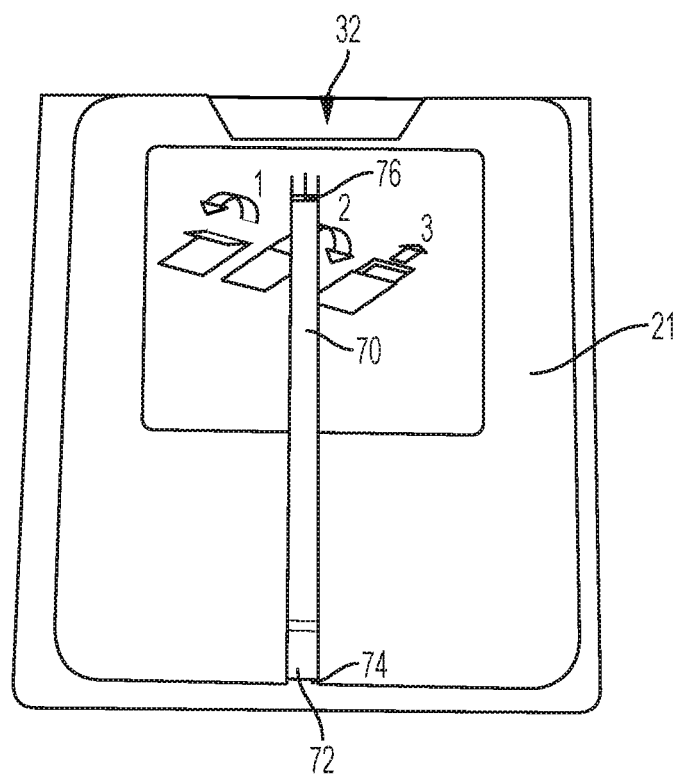
FIG. 9 is a back plan view of a third embodiment of a reclosable battery package.

Turning now to FIG. 9, an alternative embodiment of a reclosable battery package 10 is illustrated. In this embodiment, an alternative locking channel and tab limit slidable movement of the pouch 30 relative to the second body 21. More specifically, the second body 21 includes a locking channel 70, which is formed as a cut-out in the second body 21. The locking tab 72 is formed as an outwardly facing protrusion on perimeter flange 32 of the pouch 30, i.e., the locking tab 72 protrudes away from the perimeter flange. The locking tab 72 slides within the locking channel 70 in a manner similar to the embodiment of FIGS. 5-8. Also similar to the embodiment of FIGS. 5-8, the locking channel 70 includes a lower stop 74 and an upper stop 76.

Generally, a method of opening the reclosable battery package 10 of FIGS. 1-9 is discussed in more detail below. After providing a reclosable battery package 10, as illustrated in any of the embodiments of FIGS. 1-9, a consumer first folds the first removable portion 22 of the first body 16 and the second removable portion 26 of the second body 21 rearward, towards the second body 21, approximately 180 degrees relative to an unmanipulated plane of the first body 16 and the second body 21. If necessary, the first removable portion 22 and the second removable portion 26 may be folded back and forth several times to weaken the first plurality of perforations 50 and the second plurality of perforations 52. Thereafter, the consumer may tear the first body 16 and the second body 21 along the first plurality of perforations 50 and the second plurality of perforations 52 formed in the first body 16 and the second body 21, respectively. After tearing the first plurality of perforations 50 and the second plurality of perforations 52, the consumer may remove the first removable portion 22 from the first body 16 and the second removable portion 26 from the second body 21 to expose a top edge of the perimeter flange 32 of the pouch 30. Thereafter, the consumer may grasp the exposed portion of the perimeter flange 32 in the vicinity of the window provided by removal of tab 52b, and slide the pouch 30 in a first direction relative to the first body 16 and the second body 21 to expose products stored in the central receptacle 34 of the pouch 30. To reclose the pouch 30, the consumer simply slides the pouch 30 in a second direction, opposite to the first position, until the central receptacle 34 is closed by the second body 21, to provide a reclosable battery package which substantially prevents any products stored in the central receptacle 34 of the pouch 30 from being unintentionally accessible.

In other optional embodiments, the first removable portion 22 may be omitted and the pouch top perimeter flange 32a may be glued or otherwise affixed to the second body 21. In such an embodiment, the pouch 30 is slidable relative to the first body 16 and to the second body 21 when the glue or adhesive seal is broken between the top perimeter flange 32 and the second body 21.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A battery package comprising:
   a first panel, the first panel including a first body having a first main portion, a first removable portion removably attached to the first main portion by a first plurality of perforations, and a center open portion;
   a second panel, the second panel including a second body having a second main portion and a second removable portion removably attached to the second main portion by a second plurality of perforations; and
   a pouch, the pouch having a perimeter flange and a central receptacle, the central receptacle protruding outward, away from the perimeter flange,
   wherein the first body and the second body are joined along perimeter edges of the first body and the second body and the pouch perimeter flange is disposed between the first body and the second body, the central receptacle extending through the center open portion of the first body,
   wherein the pouch is slidably movable between the first main portion and the second main portion when the first removable portion is removed from the first body and the second removable portion is removed from the second body exposing a first edge of the center open portion and a top edge of the pouch, so that an interior portion of the central receptacle is exposed when the pouch is slidably moved relative to the first main portion and to the second main portion, and wherein the second plurality of perforations includes an offset set of perforations defining a tab portion that is aligned with a portion of the perimeter flange of the pouch, such that, when the first removable portion and the second removable portion, including the tab portion thereof, are removed from the first and second bodies, a graspable portion of the perimeter flange of the pouch is exposed.

2. The battery package of claim 1, wherein the first plurality of perforations are non-aligned with the second plurality of perforations.

3. The battery package of claim 2, wherein the first plurality of perforations extend from a first corner of the center open portion towards the perimeter edge of the first body and from a second corner of the center open portion towards the perimeter edge of the first body.

4. The battery package of claim 3, wherein the first plurality of perforations includes a first lateral set of perforations and a second lateral set of perforations, the first lateral set of perforations extending from the first corner of the center open portion towards the perimeter edge of the first body in a first direction, and the second lateral set of perforations extending from the second corner of the center open portion towards the perimeter edge of the first body in a second direction.

5. The battery package of claim 4, wherein at least one of the first lateral set of perforations and the second lateral set of perforations is non-linear.

6. The battery package of claim 4, wherein the first lateral set of perforations is separated from the first corner of the center portion by a first tie portion, and the second lateral set of perforations is separated from the second corner of the second portion by a second tie portion.

7. The battery package of claim 6, wherein the first tie portion has a tie length between the first corner and closest perforation in the first lateral set of perforations, the tie length being between 0.15 in and 0.4 in.

8. The battery package of claim 2, wherein the second plurality of perforations extends across the second body and the second plurality of perforations is oriented parallel to the first edge of the center open portion.

9. The battery package of claim 8, wherein the offset set of perforations is parallel to the first edge of the center open portion, while being offset from a remainder of perforations in the second plurality of perforations.

10. The battery package of claim 9, wherein the tab portion is offset from the remainder of perforations in the second plurality of perforations by a tab distance, the tab distance being approximately 0.5 in.

11. The battery package of claim 9, wherein the second body includes a crease that is offset from the tab portion, the crease being co-linear with the perforations in the second plurality of perforations that are not part of the tab portion.

12. The battery package of claim 1, wherein the center open portion includes a bottom edge that is curved.

13. The battery package of claim 12, wherein the bottom edge is curved in an arc that is approximately 0.25 in deep.

14. The battery package of claim 1, wherein the first body and the second body comprise paperboard and the pouch comprises a thermoplastic material.

15. The battery package of claim 14, wherein the paperboard in the first body includes fibers that are oriented generally perpendicular to at least some of the perforations in the first plurality of perforations and the second body includes fibers that are oriented generally perpendicular to at least some of the perforations in the second plurality of perforations.

16. The battery package of claim 1, further comprising at least one battery disposed in the central receptacle of the pouch.

17. A battery package comprising:
a first panel, the first panel including a first body having a first main portion, a first removable portion removably attached to the first main portion, and a center open portion;
a second panel, the second panel including a second body having a second main portion; and
a pouch, the pouch having a perimeter flange and a central receptacle, the central receptacle protruding outward, away from the perimeter flange,
wherein the first body and the second body are joined along perimeter edges of the first body and the second body and the pouch perimeter flange is disposed between the first body and the second body, the central receptacle extending through the center open portion of the first body,
wherein the pouch is slidably movable between the first main portion and the second main portion when the first removable portion is removed from the first body exposing a first edge of the center open portion and a top edge of the pouch, so that an interior portion of the central receptacle is exposed when the pouch is slidably moved relative to the first main portion and to the second main portion, and
wherein at least one of the first body and the second body includes a locking channel and the pouch includes a locking tab disposed on the perimeter flange, the locking tab being slidable within the locking channel and the locking channel limiting a slidable distance of the pouch relative to at least one of the first body and the second body.

18. A method of opening a package, the method comprising:
providing a package having a first panel, the first panel including a first body having two sets of opposed side edges and a center open portion; a second panel, the second panel including a second body having two sets of opposed side edges; and a pouch, the pouch being slidably disposed between the first body and the second body;
folding portions of the first body and the second body rearward, towards the second body, approximately 180 degrees relative to an unmanipulated plane of the first body and the second body;
tearing the first body and the second body along perforations formed in the first body and the second body to expose a top edge of the pouch between the first and second bodies, the second body including a tab portion defined by the perforations formed therein such that a graspable portion of a perimeter flange of the pouch is exposed as a result of the first body and the second body being torn along the perforations; and
sliding the pouch in a first direction relative to the first body and the second body to expose products stored in an interior of the pouch.

19. The method of claim 18, further comprising sliding the pouch in a second direction, opposite to the first position, to close the interior of the pouch, thereby reclosing the package.

* * * * *